United States Patent [19]
Choux et al.

[11] 3,760,534
[45] Sept. 25, 1973

[54] FLOWER STAND FOR HOLDING POTS IN ONE OF TWO ALTERNATIVE POSITIONS

[76] Inventors: Antoine E. Choux, Rue du Midi 61; Pierre Gaudard, Rue d'Orpond 50, both of Canton of Bern, Bienne, Switzerland

[22] Filed: June 3, 1971

[21] Appl. No.: 149,610

[52] U.S. Cl. ..................................... 47/39, 211/71
[51] Int. Cl. ............................................. A47g 7/02
[58] Field of Search .......................... 47/38, 39, 40; 108/144; 248/188.2, 157

[56] References Cited
UNITED STATES PATENTS

| | | |
|---|---|---|
| 1,989,403 | 1/1935 | Dauernheim .......................... 47/39 |
| 1,474,753 | 11/1923 | Zrebiec .................................... 47/39 |
| 2,725,579 | 12/1955 | Derby .............................. 108/144 X |
| 3,078,020 | 2/1963 | Boonstra ......................... 47/39 UX |
| 3,099,355 | 7/1963 | Lane ................................... 47/39 X |

*Primary Examiner*—Robert E. Pulfrey
*Assistant Examiner*—E. M. Coven
*Attorney*—Silverman & Cass

[57] ABSTRACT

A flower stand for supporting a plurality of flower pots. The stand includes a frame with detachable cover having pot-receiving apertures, the cover being adapted for positioning alternatively flush with the upper edge of the frame or recessed from said edge, the latter position permissive of admitting soil or decorative material to the stand surrounding the pots retained in the apertures.

5 Claims, 4 Drawing Figures

PATENTED SEP 25 1973

3,760,534

INVENTORS:
ANTOINE E. CHOUX
PIERRE GAUDARD

By: *Silverman & Cass*

ATTORNEYS.

FLOWER STAND FOR HOLDING POTS IN ONE OF TWO ALTERNATIVE POSITIONS

The present invention concerns a flower-stand comprising a frame provided with a detachable cover bored with holes for accomodating containers used for the culture of plants.

This flower-stand is characterized by the fact that it comprises means for setting the cover in a position wherein it is essentially flush with the upper edge of said frame, and in a position wherein it is located downwards relative to this edge, so that said frame and said cover go together to make a box for admitting gravel, soil or any other material for decorating purposes.

The drawings represents, as an Example, one particular embodiment of the invention.

Figure 1:
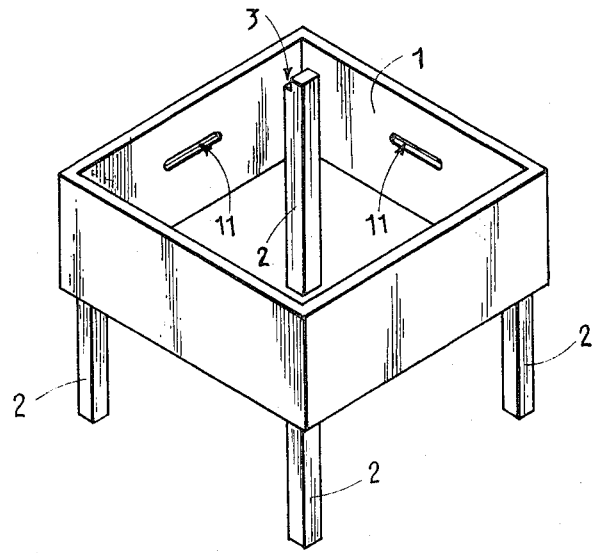
FIG. 1 is a view, in perspective, of a portion of the flower-stand having a generally square shape.

The frame of the flower-stand represented comprises a frame 1, having a generally square shape, to each corner of which are attached feet 2 having a square cross-section. These feet could be made of two sections axially abutting each other and screwed to each other. Each of these feet is provided, at its upper end, with a notch 3 for admitting a tenon of a block, having a generally parallelepipedic shape, which is set up, in its working position, on the foot 2 and thus is used as a bracket or cleat for supporting a cover 5 of the flower-stand. This cover is bored with openings 6, with tapered walls, for accomodating flower-pots 7 having a double-wall, also tapered, for cultivating plants. A detachable leak-proof tank 8, supported by cleats 9 carried by feet 2, will be able to contain the water for the common flooding of the plants held by the plurality of pots 7.

Figure 2:
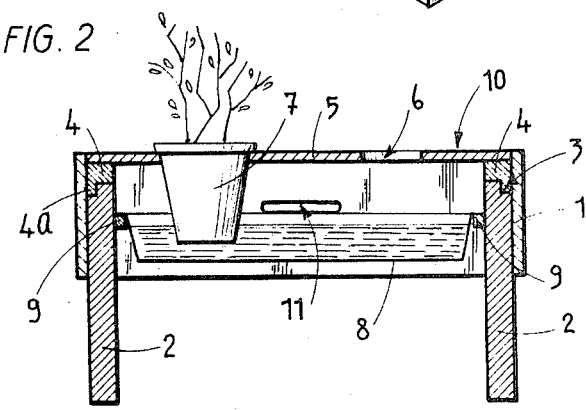
FIG. 2 is a median sectional view of the flower-stand in one of the allowed positions of the cover.
Figure 4:
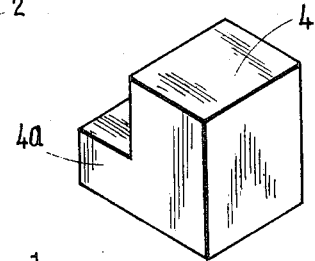
FIG. 4 is a view, in perspective, of a detail, on an enlarged scale.

When the cover occupies the position represented in FIG. 2, seated on the cleats 4, its outside face 10, the aspect of which is identical with that of the external side of the walls of the frame 1, stays flush with the upper edge of the latter.

Figure 3:
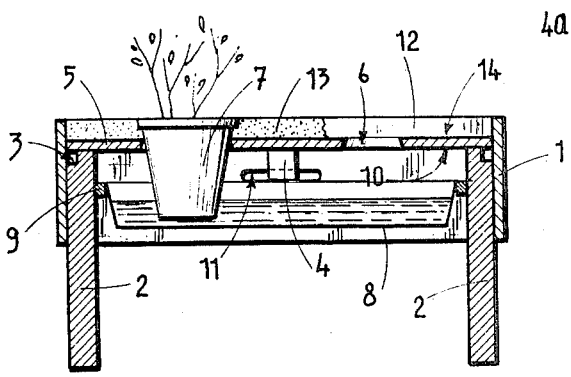
FIG. 3 is a similar sectional view in another position of the cover.

As shown in FIG. 3, the blocks 4 can also be engaged in the slots 11 of the walls of the frame 1, in which case the uppermost surfaces of the blocks will lie in the same plane as the tops of feet 2. The plane defined by the tops of feet 2 and the upper surfaces of blocks 4 when positioned in slots 11 is below the upper edge of the frame 1.

It results that, in this position, the cover is also in a downward position with regard to the upper edge of the frame 1 so that, together with the latter, it goes to make a tub or box for holding soil 13, gravel or any other ornamental material, preferably of granular kind.

The cover 5 is supported, in this position, not only at its four corners but also at the middle of its four sides, which is advantageous since it should bear the weight of the material 13.

It should be noticed that the cover is up-side-down in comparison with its position represented in FIG. 2, so that the openings 6 are tapering upwards and not downwards as in the case of FIG. 2; pots 7 are consequently less deeply inserted in said openings and are essentially flush with the top level of the ornamental material 13.

The surface of the cover 5, indicated 14, opposite to face 8, shall preferably be painted with a varnish to protect it from the damages due to the presence of moisture from the material 13. It will also be possible to use, for making the cover and also the walls of the frame 1, boards of aggregated or plastic materials, coated on both sides with coloured laminates or with a wooden pattern, said coating being moisture-proof.

What we claim is :

1. A flower stand for retaining a flower pot in one of two alternate positions with respect to the top of the stand comprising, a walled frame having a plurality of feet for elevating the stand above floor level, an extension of each foot disposed on the inside perimeter of the frame and terminating below the top thereof, the top of each extension being notched, an apertured cover plate adapted for supported positioning within the frame to receive the flower pot within the aperture, a plurality of notched blocks for removable positioning in mating engagement upon the notched extensions to increase the longitudinal dimension of the extensions proximate the top of the stand, and each wall of the frame having an elongate horizontally-disposed slot for removable receipt of a selected block, whereby said blocks may be positioned respectively upon the extensions to support the cover plate in a first position at the top of the stand with the top of the pot elevated above the top of the stand and said blocks may be relocated respectively within the wall slots such that the cover plate will be disposed below the top of the stand in a second position with the top of the pot positioned below the top of the stand, the cover plate being supported in the second position by the tops of the extensions and the tops of the blocks disposed in the slots.

2. A flower stand as claimed in claim 1 in which the blocks are of substantially parallelopipedic configuration, a tenon protruding from one face of each block to form the notch thereon, said blocks being engageable in the wall slots by positioning the tenon of each block within a respective slot.

3. A flower stand as claimed in claim 1 for use with a flower pot of generally conical configuration, the aperture of the cover plate having a tapered circumferential wall, the cover plate being adapted for reversable positioning within the frame such that the plate may be disposed with the taper of the opening directed upwardly whereby the pot will matingly engage therein and the plate may be reversed such that the taper of the opening is disposed downwardly whereby the pot will rest within the opening at a different elevation than when the plate is positioned with the taper directed upwardly.

4. A flower stand as claimed in claim 1 in which the stand includes a leak proof tank detachably secured thereto to form a bottom for said frame.

5. A flower stand as claimed in claim 1 in which the frame has four sides and there are four feet, one of each foot being positioned at a corner of the frame.

* * * * *